United States Patent
Kristensen et al.

(10) Patent No.: US 6,267,204 B1
(45) Date of Patent: Jul. 31, 2001

(54) DEVICE FOR THE SUPPLY OF LIQUID UNDER PRESSURE TO AN ELEMENT AT A ROTATING AXIS

(75) Inventors: Aksel Kristensen, Södertälje; Sven-Åke Nilsson, Gnesta; Jouko Pitkämäki, Tumba; Carl Peder Öhlander, Hägersten; Robert Sandblom, Älvsjö, all of (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/424,023

(22) PCT Filed: Jun. 9, 1998

(86) PCT No.: PCT/SE98/01105

§ 371 Date: Nov. 16, 1999

§ 102(e) Date: Nov. 16, 1999

(87) PCT Pub. No.: WO98/57752

PCT Pub. Date: Dec. 23, 1998

(30) Foreign Application Priority Data

Jun. 16, 1997 (SE) .................................................. 9702291

(51) Int. Cl.⁷ ....................................................... F01M 1/00
(52) U.S. Cl. ........................ 184/6.16; 184/6.18; 184/6.12; 184/6.22; 384/398; 384/415
(58) Field of Search .................................. 184/6.16, 6.18, 184/6.12, 6.22; 384/369, 373, 398, 415

(56) References Cited

U.S. PATENT DOCUMENTS

| | | | |
|---|---|---|---|
| 3,687,233 | * 8/1972 | Greenwald | 184/6.18 |
| 4,025,130 | 5/1977 | Streifert | 308/9 |
| 4,527,912 | 7/1985 | Klusman | 384/99 |
| 4,875,840 | * 10/1989 | Johnson et al. | 418/55 |
| 5,893,706 | * 4/1999 | Kawaguchi et al. | 417/373 |

FOREIGN PATENT DOCUMENTS

| | | |
|---|---|---|
| 556981 | 12/1974 | (CH) . |
| 0054502 | 6/1982 | (EP) . |
| 361080 | 10/1973 | (SE) . |
| 460458 | 10/1989 | (SE) . |

OTHER PUBLICATIONS

Inernational Search Report

* cited by examiner

Primary Examiner—David Fenstermacher
(74) Attorney, Agent, or Firm—Fish & Richardson P.C.

(57) ABSTRACT

A device for the supply of a liquid under pressure to a flow passage (13) in a member in a shaft suspension unit (1) of a centrifugal separator, which has a stationary casing (3) and a unit, which is resiliently and oscillation dampingly suspended in the casing (3) by at least one elastical element (10), the member forming a part of the composed unit. To be able to supply liquid to the member in a sample manner with a certain controllable flow which is made sure under over-pressure a first supply channel portion (19) is connected to a liquid source (16) for the supply of liquid under pressure extending through the stationary casing (3). To the first supply channel portion (19) there is connected a second supply channel portion (21) extending through the elastical element (10). A third supply channel portion (23) is connected to the second supply channel portion (21), extending through the non-rotatable part of the composed unit and having an outlet opening (24) in the flow passage (13).

8 Claims, 3 Drawing Sheets

DEVICE FOR THE SUPPLY OF LIQUID UNDER PRESSURE TO AN ELEMENT AT A ROTATING AXIS

FIELD OF THE INVENTION

The present invention concerns a device for the supply of a liquid under pressure to a member having at least one flow passage, through which this liquid is passing and which is kept filled up with the liquid, in a shaft suspension device of a centrifugal separator. The suspension device has a stationary casing and a unit composed of parts, which are rotatable around a rotational axis, and non-rotatable parts. The unit is resiliently supported in the casing by means of at least one elastical element in such a way that the unit during operation is admitted to oscillate relative to the casing while it is influenced by the elastical element with an essentially radially inwardly directed spring force under damping influence by the elastical element on the oscillating movements of the unit. The member forms a part of the composed unit.

BACKGROUND OF THE INVENTION

In centrifugal separators provided with a shaft suspension device of this kind the elastical element acts with a well defined radially inwardly directed spring force, which during operation strives to bring the composed unit back to a central position and damps effectively the oscillating movements of it, which can be very critical during the passage of critical number of revolutions or when heavy unbalances occur during operation. Furthermore, bearing devices of this kind often are cheaper than alternative possible solutions.

In some centrifugal separators you need to be able to supply during operation a liquid under pressure to a member forming a part of the composed unit. One example when you need this is centrifugal separators, which demand an effective cooling of the bearings. Another example is centrifugal separators, in which a gap between a stationary part and a part oscillating during operation is sealed by means of a liquid gap sealing. A third example is centrifugal separators journally supported hydraulically, in which rotating parts are supported by a carrying oil film. However, in this case the flow passage has to be throw flown by a small amount of oil, which corresponds to the amount of oil, which leaves the hydraulic bearing through leakage or the like.

SUMMARY OF THE INVENTION

The object of the present invention is to accomplish a device for the supply of the liquid under pressure to a member in a shaft suspension unit of a centrifugal separator of the kind initially described, the member having at least one flow passage, which during operation is throw flown by and is kept filled with this liquid, which makes it possible to supply liquid to the member in a simple manner with a certain controllable flow, which is made sure under overpressure.

According to the present invention this is accomplished by providing a device for the supply of liquid of the kind initially described with a first supply channel portion, which is connected to a liquid source for the supply of liquid under pressure, and which extends through the stationary casing, a second supply channel portion, which hydraulic pressure transmittingly is connected to the first supply channel portion, and which extends through the elastical element, and a third supply channel portion, which hydraulic pressure transmittingly is connected to the second supply channel portion, and which extends through a non-rotatable part in the composed unit, and which has an outlet opening in said flow passage.

Hereby, the elastical element already present in the shaft suspension device of the centrifugal separator for another purpose also is used to form an elastical supply channel portion, which makes it possible in a very simple manner hydraulic pressure transmittingly connect a supply channel portion extending through the casing, which is stationary (i.e. is not rotating and is not oscillating with the oscillating movements of the composed unit), with a supply channel portion, which extends through the non-rotating part of the composed oscillating unit.

In another embodiment of the invention there is formed in the stationary casing an inlet chamber, which is sealed off by means of the elastical element, which is annularly shaped and surrounds the rotation axis, between a part, which is connected to the casing and a part, which is connected to the non-rotatable part of the composed unit, the first channel portion having an outlet opening in the inlet chamber and the second channel portion having an inlet opening in the inlet chamber.

In a preferred variant of this embodiment of the invention the device comprises at least two annular and the axis surrounding elastical elements, which sealingly bear against a stationary part connected to the casing and against a non-rotatable annular part connected to the composed unit, the non-rotatable annular part extending between these components.

Suitably, the second channel portion is arranged in the non-rotatable portion connected to the composed unit.

BRIEF DESCRIPTION OF THE DRAWINGS

In the following the invention will be described more in detail with reference to the attached drawings, on which FIG. 1 schematically shows an axial section through a shaft suspension device in a centrifugal separator, which is provided with an embodiment of a device for the supply of liquid to the same according to the present invention, FIG. 2 schematically shows an axial section through a shaft suspension device in a centrifugal separator, which is provided with another embodiment of a device for the supply of liquid to the same according to the present invention, and FIG. 3 schematically shows an axial section through a shaft suspension device in a centrifugal separator, which is provided with the third embodiment of a device for the supply of liquid to the same according to the present invention.

DETAILED DESCRIPTION

Figure 1:
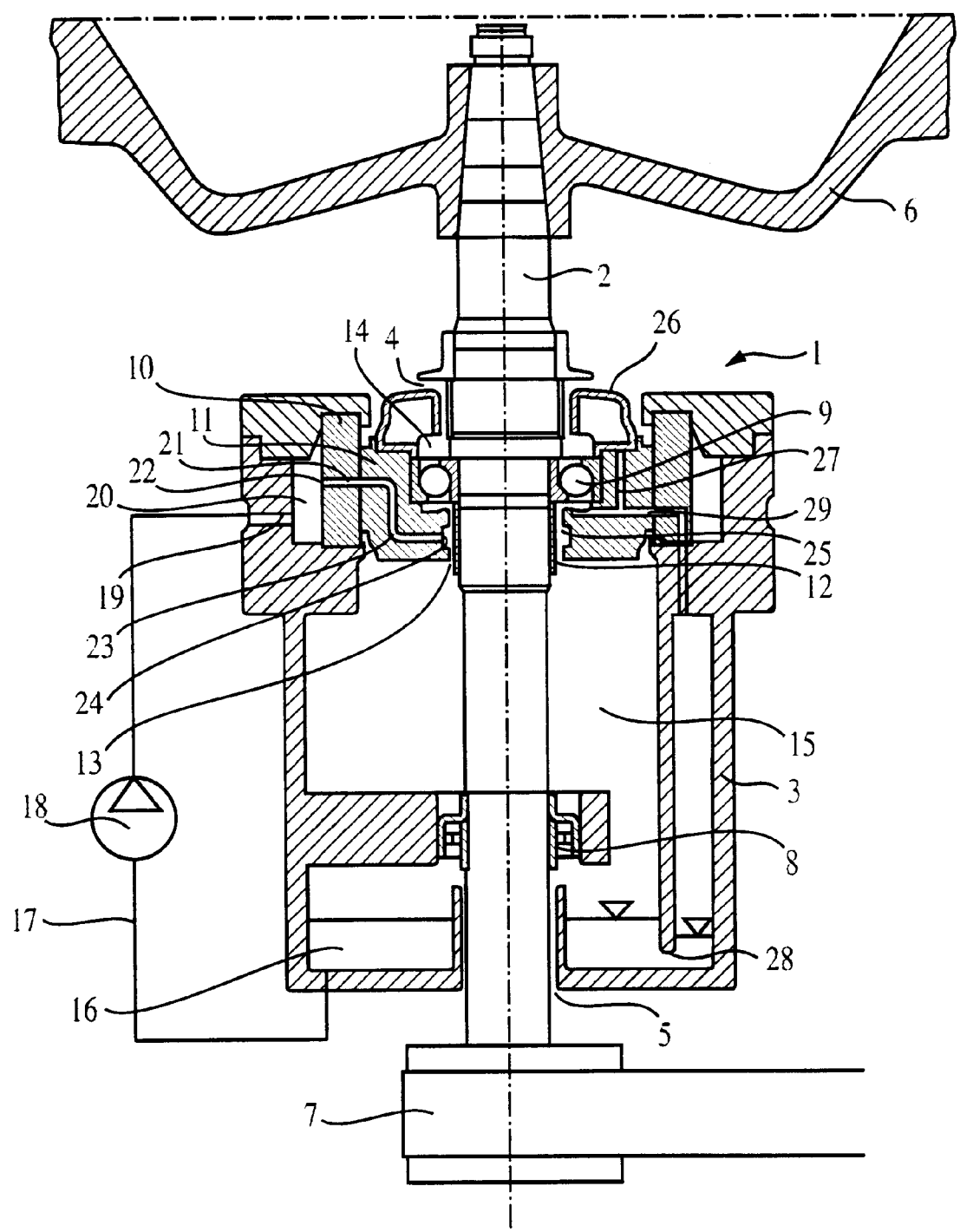

The shaft suspension device shown in the FIG. 1 supports the shaft 2 of the centrifugal separator. The shaft suspension device 1 has a stationary casing 3, which surrounds the shaft 2. In the axial end portions of the casing 3 two openings 4 and 5, respectively, are arranged, through which the shaft 2 extends. On one axial end of the shaft a rotor 6 is fixedly mounted and on the other axial end of it a belt drive 7 is arranged for the driving of the shaft 2. The shaft 2 is journally supported in a lower bearing 8, which essentially is directly connected to the stationary casing 3, and in an upper bearing 9, which is connected to the stationary casing 3 via an annular elastical element 10. The elastical element 10 abuts against a non-rotatable part 11 of the composed unit, which is resiliently suspended in the casing 3 by means of the elastical element 10. The non-rotatable part 11 consists in this embodiment of the first annular sealing element 11, which extends around the shaft 2 and connects the elastical element 10 to the upper bearing 9 at the same time as it constitutes the bearing housing for the upper bearing 9. Radially inside the first sealing element 11 there is arranged a second annular sealing element 12, which is connected to the shaft 2 around the same and together with the first sealing element 11 forms an annular flow passage 13 surrounding the shaft 2.

The sealing elements 11 and 12 divide a space inside the casing 3 in two departments 14 and 15, which are connected to one opening each 4 and 5, respectively. To prevent the air or gas volumes from communicating with each other during operation via the through passage 13 this is arranged to be kept filled up with liquid.

For this purpose a liquid source 16 for oil is arranged in the lower part of the shaft suspension device 1, to which a conduit 17 is connected. This conduit is provided with a pump 18 and is connected to a first supply channel portion 19, which opens in a closed chamber 20 radially outside the first sealing element 11. In the elastical element 10 a second supply channel portion 21 is arranged, which has an inlet opening 22 in the closed chamber 20 and is thus hydraulical pressure transmittingly connected to the first supply channel portion 19 via the closed chamber 20. In the first sealing element 11 a third supply channel portion 23 is arranged, which hydraulical pressure transmittingly is connected to the second supply channel portion 21, and which has an outlet opening 24 in a recess 25, which is formed in a central portion of the first sealing element 11. The recess 25 surrounds the shaft and is open towards the second sealing element 12. The supply channel portions 19, 21 and 23 are through flown during operation by oil under pressure, which fills up the flow passage 13. Thereby, the oil in the flow passage 13 prevents effectively air or other gas to flow between the two departments 14 and 15.

The amount of oil, which flows out of the flow passage 13 in direction towards and out into the one or the other of the two departments 14 and 15, is depending on how long and narrow the flow passage 13 is in direction towards the one department 14 in relation to how long and narrow the flow passage 13 is in direction towards the other department 15. Elements which rotate with the shaft in the one department 14 creates an air circulation, which entrains oil, which flows into this department 14, and brings a portion of this oil to flow towards and through the bearing present in this department, the second bearing 9. The oil, which has passed through the upper bearing 9 is collected in a collecting grove 26, which opens radially inwardly and is connected to a return conduit 27, through which collected oil flows back to the liquid source 17 via a liquid seal 28, which prevents air or gas circulation through the return conduit 27. The most of the oil, which flows out through the one department 14 is conducted directly to the liquid source 17 via a by-pass conduit 29, which in the shown example is connected to the return conduit 27.

Oil is supplied to the flow passage 13 at such a high pressure during operation that the flow passage 13 remains filled up at the pressure differences which are prevailing between the two departments 14 and 15. In certain cases capillary forces can be sufficient to keep the flow passage 13 filled up whereas in other cases a substantially higher pressure is needed to keep the flow passage 13 filled up with oil.

In the example shown in FIG. 1 the departments 14 and 15 communicate with the atmosphere surrounding the shaft suspension device 1 via the respective opening 4 and 5 but it is quite possible within the scope of the present invention that they communicate via adherent opening with a more or less closed chamber.

Figure 2:
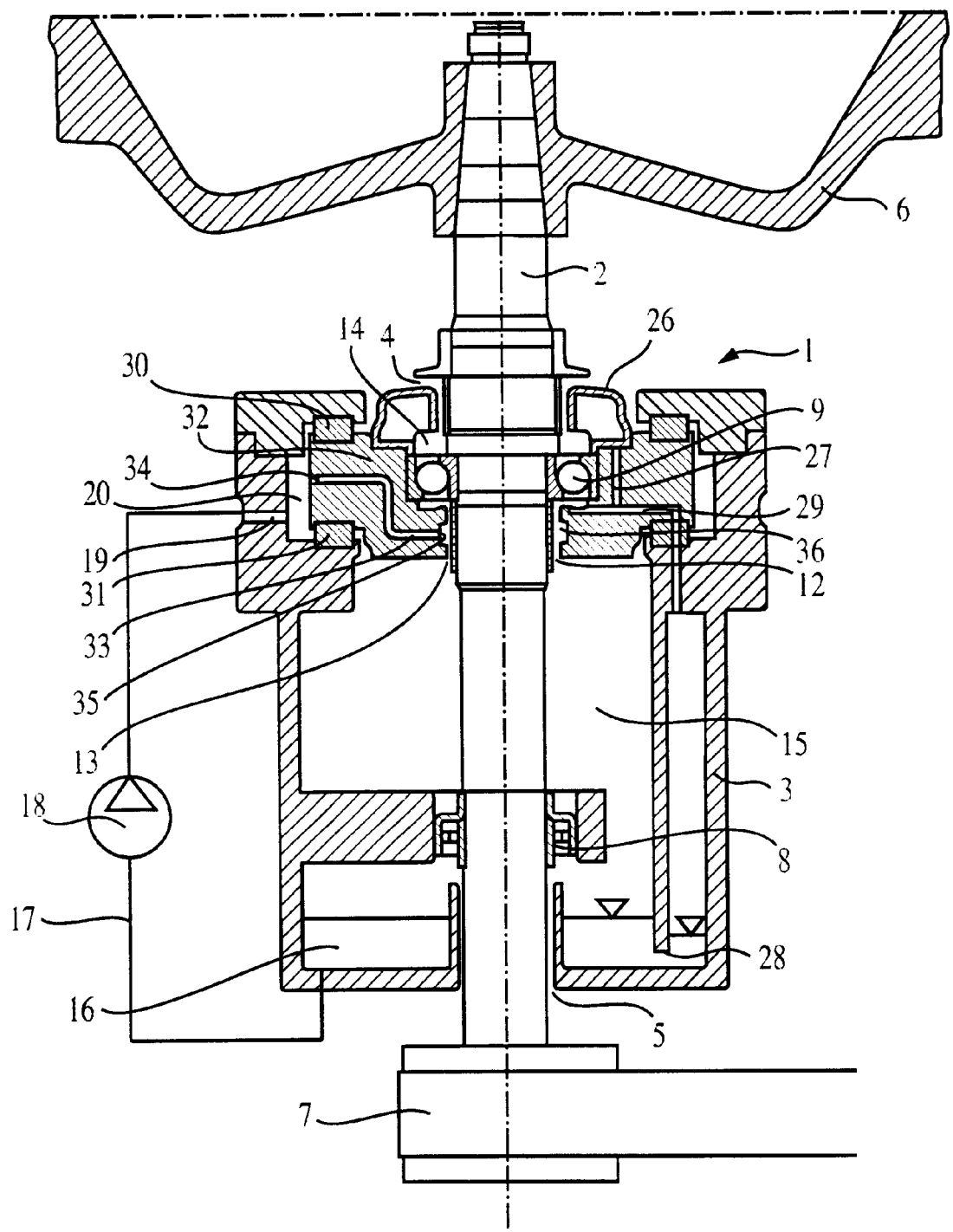

The shaft suspension device shown in FIG. 2 differs from the shaft suspension device 1, shown in FIG. 1, by the fact that the elastical element is formed by two co-operating and shaft surrounding elastical and annular components 30 and 31, in which the composed unit is resiliently suspended in the casing 3, and by the fact that is provided with a first sealing element 32, which extends radially between the two elastical components 30 and 31. In this sealing element 32 there is arranged a supply channel portion 33, which extends radially between the two elastical components 30 and 31, and which has an inlet opening 34 in the closed chamber 20 and has an outlet opening 35 in a recess 36, which is formed in a central portion of this sealing element 32. The supply channel portion 33 is hydraulic pressure transmittingly connected to the first supply channel portion 19 via the closed chamber 20, and constitutes the second as well as the third supply channel portion.

Other parts of this shaft suspension device is the same as the corresponding parts of the shaft suspension device shown in FIG. 1 and has obtained the same reference number.

In the two shaft suspension devices shown in FIGS. 1 and 2 the member, which is to be supplied with liquid, consists of a liquid gap sealing, a flow gap being constituted by the gap, which during operation shall be kept filled up with liquid to maintain the sealing function.

Figure 3:
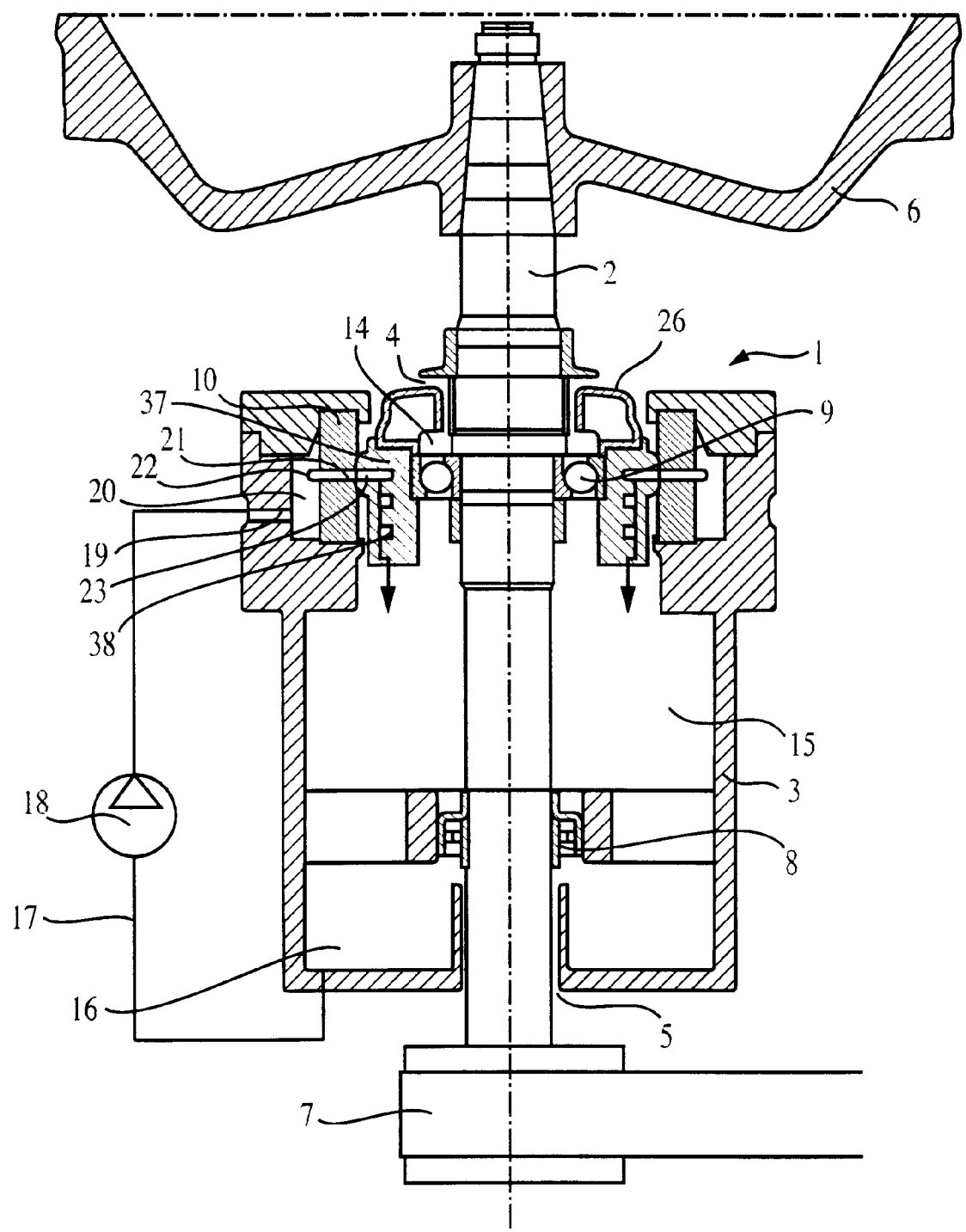

In the shaft suspension device shown in FIG. 3 the member, which is to be supplied with liquid, instead is constituted by a cooling device 37, whereas said flow passages are constituted by channels 38 for a cooling liquid arranged in the cooling device 37. The cooling device in this shaft suspension device constitutes a non-rotatable part of the composed unit at the same time as it constitutes bearing housing for the upper bearing 9. The cooling liquid, which has passed through the channels 38, flows out into the department 15 and falls down in and is collected in the liquid source 16.

The other parts in this shaft suspension device are also the same as corresponding parts of the shaft suspension device shown in FIG. 1 and have obtained the same reference numbers.

What is claimed is:

1. A device which supplies a liquid under pressure to a member having at least one flow passage (13), through which this liquid is passing and which is kept filled up with the liquid, in a shaft suspension device (1) of a centrifugal separator having a shaft, the shaft suspension device having a stationary casing (3) and a unit being composed of parts, which are rotatable around a rotational axis, and non-rotatable parts, and being resiliently supported in the casing (3) by means of at least one elastical element (10) in such a way that the unit during operation is allowed to oscillate relative to the casing while it is influenced by the elastical element (10) with an essentially radially inwardly directed spring force which causes a damping influence by the elastical element (10) on the oscillating movements of the unit, said member forming a part of the composed unit, comprising a first supply channel portion (19), which is connected to a liquid source (16) for the supply of said liquid under pressure, and which extends through the stationary casing (3), a second supply channel portion (21), for transmitting said liquid under pressure, is connected to the first supply channel portion (19), and extends through the elastical element (10), and a third supply channel portion (23), for transmitting said liquid under pressure, is connected to the second supply channel portion (21), and extends through a non-rotatable part in the composed unit, and has an outlet opening (24) in said flow passage (13).

2. A device according to claim 1, further comprising an inlet chamber (20), which is formed in the stationary casing (3) and sealed off by means of the elastical element (10), which is annular and surrounds the rotational axis, between a part which is connected to the casing (3) and a part, which is connected to a non-rotatable part of the composed unit, the first channel portion (19) having an outlet opening in the inlet chamber (20) and the second channel portion (21) having an inlet opening (22) in the inlet chamber (20).

3. A device according to claim 2, wherein that the elastical element is formed by two co-operating elastical and annular components (30,31) surrounding the shaft, in which the composed unit is resiliently suspended in the casing (3), and which sealingly bear against a stationary part connected to the casing and against a non-rotatable annular part connected to the composed unit, the non-rotatable annular part extending between these components.

4. A device according to claim 3, wherein that the second channel portion (21) is arranged in the non-rotatable annular part, which is connected to the composed unit.

5. A device according to claim 3 or 4, wherein that the non-rotatable annular part, which is connected to the composed unit extends essentially radially between the two elastical annular components (30, 31).

6. A device according to claim 1, wherein the liquid consists of oil.

7. A device according to claim 1, wherein said member comprising a liquid gap sealing device.

8. A device according to claim 1, wherein said member comprising a cooling device, said flow passages comprising channels (38) for a cooling liquid.

* * * * *